(12) United States Patent
Matsubara et al.

(10) Patent No.: US 6,827,753 B2
(45) Date of Patent: Dec. 7, 2004

(54) GAS/LIQUID SEPARATION SYSTEM

(75) Inventors: Kazuki Matsubara, Kariya (JP); Teruaki Kitano, Wako (JP)

(73) Assignees: Toyoda Boshoku Corp. (JP); Denso Corporation (JP); Honda Girken Kogyo Kabushiki Kaisha (JP)

(*) Notice: Subject to any disclaimer, the term of this patent is extended or adjusted under 35 U.S.C. 154(b) by 107 days.

(21) Appl. No.: 10/375,841

(22) Filed: Feb. 26, 2003

(65) Prior Publication Data

US 2003/0172632 A1 Sep. 18, 2003

(30) Foreign Application Priority Data

Feb. 27, 2002 (JP) ........................................ 2002-050925

(51) Int. Cl.[7] ............................................ B01D 35/157
(52) U.S. Cl. ........................ 55/417; 55/426; 55/459.1; 55/DIG. 19
(58) Field of Search ...................... 55/417, 426, 459.1, 55/DIG. 19; 123/574

(56) References Cited

U.S. PATENT DOCUMENTS 4,975,100 A * 12/1990 Ginelli .......................... 96/397

FOREIGN PATENT DOCUMENTS

| JP | 10-089039 | 4/1998 |
|----|-----------|--------|
| JP | 10-103040 | 4/1998 |

* cited by examiner

Primary Examiner—Robert A. Hopkins
(74) Attorney, Agent, or Firm—McCracken & Frank LLP

(57) ABSTRACT

A gas/liquid separation system includes a cyclone case, a gas outflow pipe including a flange, and a housing that accommodates a valve and is welded to a peripheral edge portion of an upper opening of the cyclone case. An upper opening of a cylindrical portion of the cyclone case is blocked off by the flange of the gas outflow pipe. An annular projection is formed at the flange and at the housing. The annular projections fit together with an annular recess formed in the upper opening edge portion of the cyclone case. The gas outflow pipe and the housing are welded at the upper opening edge portion of the cyclone case. A sealing property can be secured without using seal members, and welding portions are few.

14 Claims, 7 Drawing Sheets

GAS/LIQUID SEPARATION SYSTEM

BACKGROUND OF THE INVENTION

1. Field of the Invention

The present invention relates to a gas/liquid separation system for blow-by gas.

2. Description of the Related Art

A cyclone case 70 and a PCV valve 72 shown in FIG. 7 are used as a system for returning blow-by gas leaking from a combustion chamber in an automobile to an air intake system to allow the gas to be reburned inside the combustion chamber. The cyclone case 70 is a device that separates the blow-by gas leaking from the combustion chamber into gas and oil.

The PCV valve 72 is a device that regulates the flow volume of the gas and returns the gas to the air intake system, and a valve is slidably accommodated inside a PCV valve housing 72A.

However, because the cyclone case 70 and the PCV valve 72 are separate parts, the cyclone case 70 and the PCV valve 72 must be connected. As methods for this connection, a method (not illustrated) in which the cyclone case and the PCV valve are connected by a hose and a method in which bosses 74 are disposed at the cyclone case 70, with the PCV valve housing 72A being fitted thereto, have been adopted.

However, in the structure in which the PCV valve housing 72A is fitted to the bosses 74 of the cyclone case 70, the welding process becomes complicated because there are two bosses 74 to which the PCV valve housing 72A is fitted, and gas leakage cannot be completely suppressed if there are no seal members such as O-rings 73 because the PCV valve housing 72A is fitted to the bosses 74. Moreover, the size of the overall system becomes larger in order to connect several parts.

SUMMARY OF THE INVENTION

In consideration of the above-described facts, it is an object of the present invention to provide a gas/liquid separation system in which a process by which a cyclone case and a PCV valve are welded is reduced, in which a sealing property at an outflow portion that returns gas to an air intake system can be secured, and in which the overall structure is compact.

A gas/liquid separation system of an aspect of the invention is a gas/liquid separation system, comprising: a cyclone case including a cavity having an opening at an upper portion thereof, the cyclone case causing gas that is introduced to the cavity and includes oil mist to be circulated along a surface of the cavity and separating the gas into gas and oil; a gas outflow pipe including a flange that blocks the opening and a pipe that passes through the flange and allows the gas to circulate to the outside of the cavity; and a housing including a valve that adjusts the flow volume of the gas flowing out from the pipe, with the housing being welded to a peripheral edge portion of the upper opening of the cyclone case so as to accommodate the valve and cover the flange, and allowing the gas that has flowed out from the pipe to flow to the outside of the system.

The gas that is introduced to the cavity is blow-by gas leaking from a combustion chamber in an automobile. According to the gas/liquid separation system of the aspect of the invention, when the blow-by gas is introduced to a cylindrical portion of the cyclone case, the blow-by gas is made to gyrate inside the cyclone case and is separated into gas and oil. The gas flows out to the gas pipe of the gas outflow pipe, and the flow volume of the gas flowing to an air intake system is adjusted by the valve.

The upper opening of the cylindrical portion of the cyclone case is blocked off by the flange of the gas outflow pipe, and the housing in which the valve is accommodated is welded to the upper opening edge portion of the cyclone case. In this manner, the cyclone case and the housing can be welded in a state in the cyclone case and the housing are joined together, with the upper opening edge portion of the cyclone case, and not a periphery of the gas pipe, serving as the portion at which the cyclone case and the housing are welded. Thus, the sealing property can be secured without using seal members, and one portion can serve as the welding portion.

In the aspect of the invention, the cyclone case may have an annular shape suited for fitting at the edge portion of the opening, and the housing may have a shape that can be fitted together with the annular shape at a position facing the annular shape and may be fitted together with the cyclone case. The invention can be also configured so that the flange further has a shape that can be fitted together with the annular shape at a position facing the annular shape of the cyclone case, so that the housing and the flange fit together with the cyclone case.

That is, in the aspect, an annular fitting portion is formed at the upper opening edge portion of the cyclone case, and an annular fitted portion that fits together with this annular fitting portion is formed at the flange and at the housing.

By configuring the invention as described above, the annular fitted portions formed at the flange of the gas outflow pipe and at the housing are fitted together with the annular fitting portion formed at the upper opening edge portion of the cyclone case. Thus, three parts—the housing accommodating the valve, the cyclone case, and the gas outflow pipe—can be simultaneously welded.

The invention can also be configured so that the cyclone case includes an annular step portion formed at an inner wall near the opening and the flange includes an outer peripheral wall, with an annular rib being included at an upper edge thereof, so that the annular step portion and the annular rib engage.

The annular rib formed at the outer peripheral portion of the flange of the gas outflow pipe engages with the step portion formed at the inner wall of the cyclone case, and the gas outflow pipe is sandwiched between the cyclone case and the housing. Thus, welding of the gas outflow pipe can be omitted.

BRIEF DESCRIPTION OF THE DRAWINGS

FIG. 3 is a cross-sectional view of a PCV valve in the gas/liquid separation system pertaining to the first embodiment of the invention, and illustrates a state in which blow-by gas is being sucked in;

DESCRIPTION OF THE PREFERRED EMBODIMENTS

A first embodiment of a gas/liquid separation system of the invention will be described on the basis of the drawings.

Figure 1:
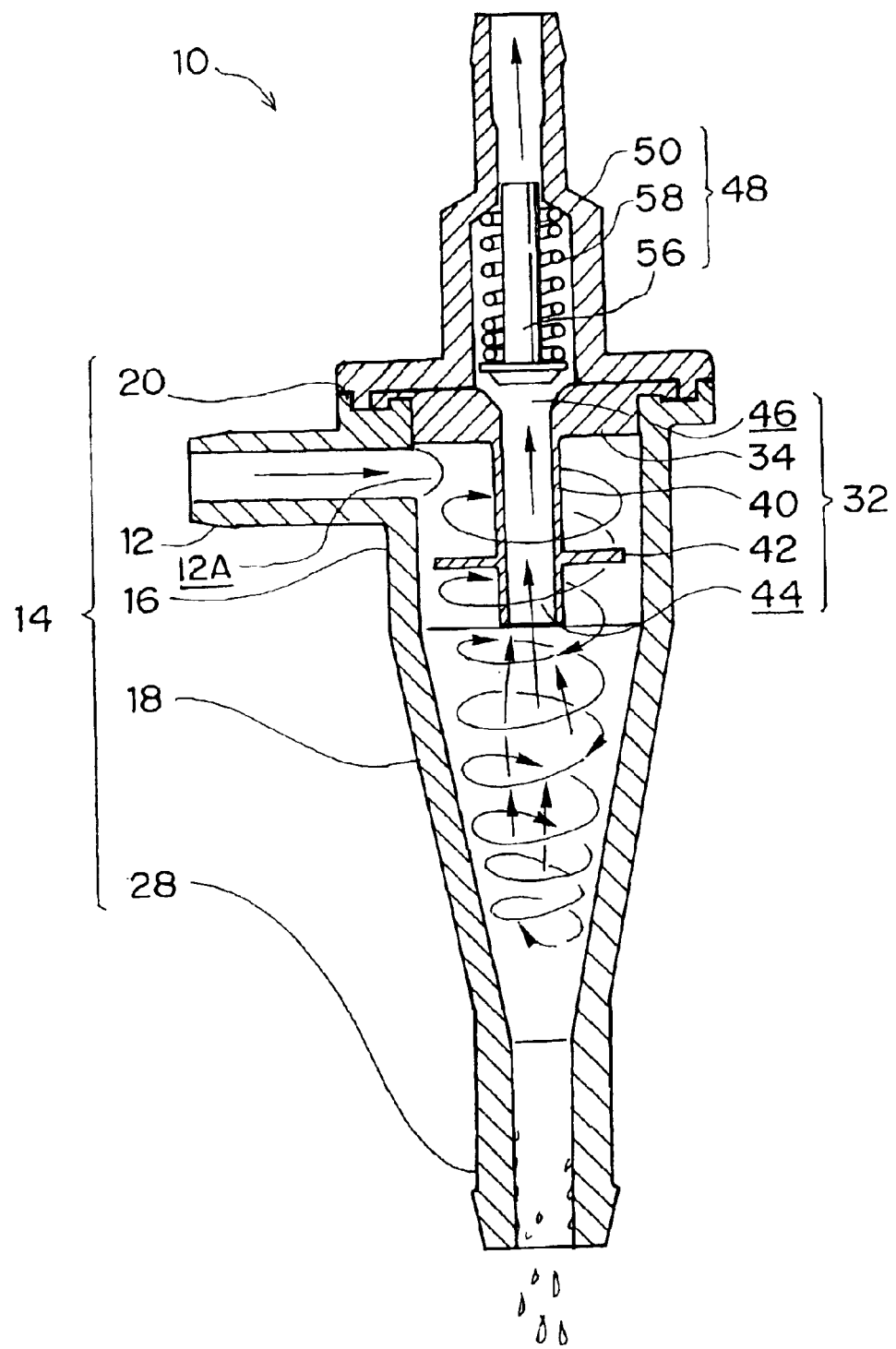
FIG. 1 is a longitudinal cross-sectional view of a gas/liquid separation system pertaining to a first embodiment of the invention.
Figure 2:
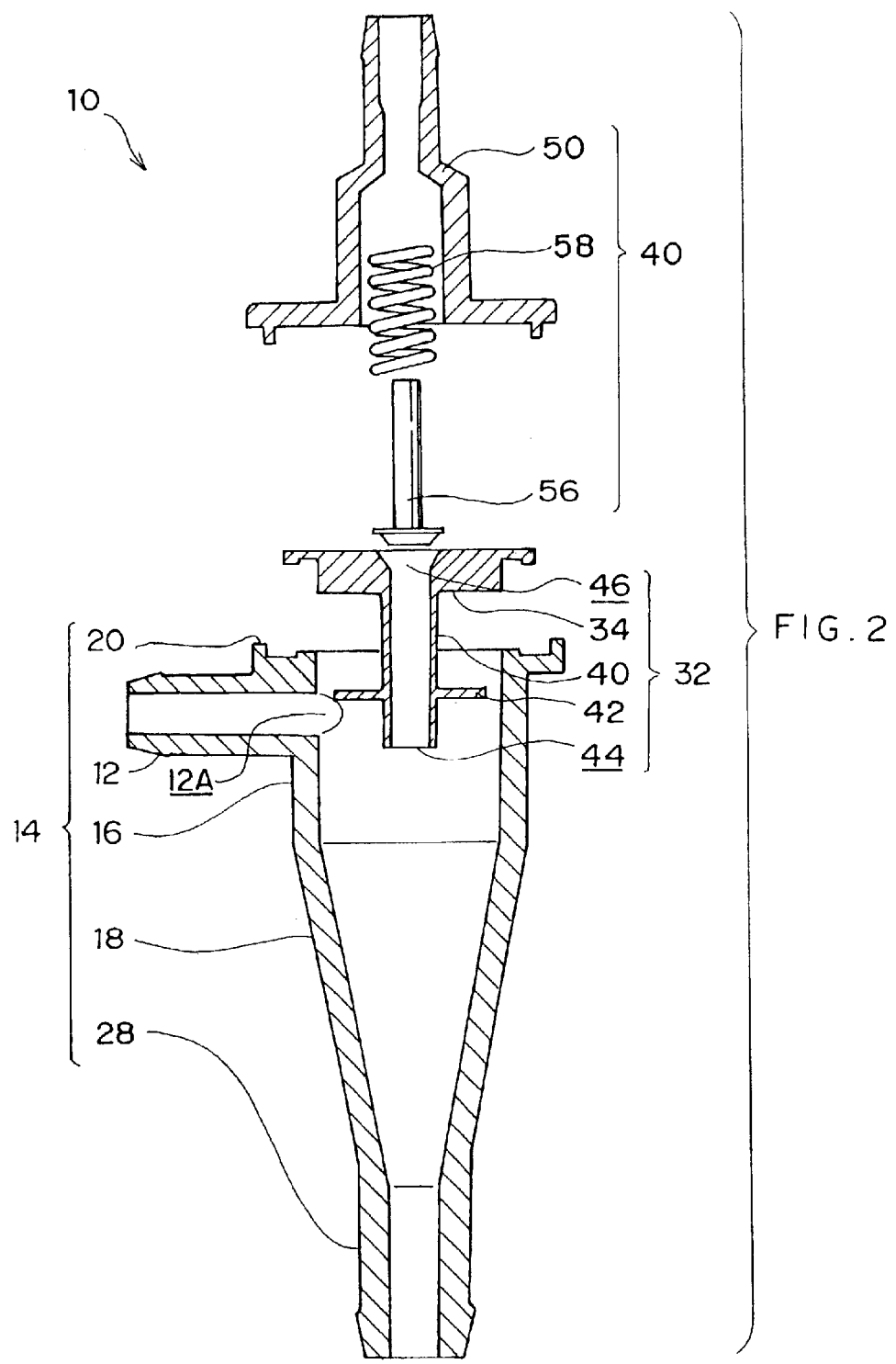
FIG. 2 is an exploded view of the gas/liquid separation system pertaining to the first embodiment of the invention.

As shown in FIGS. 1 and 2, a gas/liquid separation system 10 includes a cyclone case 14. The cyclone case 14 is disposed such that a central axis thereof is substantially vertical. A cylindrical portion 16 is formed at an upper portion of the cyclone case 14. A gas inflow pipe 12 is disposed at a side surface of the cylindrical portion 16, and a gas inflow port 12A opens in a tangential direction of the cylindrical portion 16.

When blow-by gas including oil mist is introduced from the gas inflow pipe 12, the introduced blow-by gas gyrates and descends along an inner wall surface of the cylindrical portion 16. Thus, oil mist that is acted upon by centrifugal force strikes an inner wall surface of the cyclone case 14, and the blow-by gas is separated into gas and oil. A tapered portion 18 is formed beneath the cylindrical portion 16. An inner diameter of a lower portion of the tapered portion 18 is smaller than an inner diameter of the cylindrical portion 16, and the diameter of the tapered portion 18 becomes smaller from top to bottom. An oil discharge pipe 28 is disposed below the tapered portion 18. Oil that has been separated descends from the cylindrical portion 16 along an inner wall surface of the tapered portion 18 due to the force of gravity, and is discharged to an oil tank (not illustrated) from the oil discharge pipe 28.

A gas outflow pipe 32 is disposed above the cylindrical portion 16 of the cyclone case 14. A flange portion 34 is included at the gas inflow pipe 32. The flange portion 34 is disposed so as to block an upper opening of the cylindrical portion 16 of the cyclone case 14.

A gas pipe 40 is formed at a central portion of the flange portion 34 so as to pass through the flange portion 34. The gas pipe 40 is a cylinder that extends downward from the flange portion 34, and is disposed on the central axis of the cyclone case 14. A lower opening 44 of the gas pipe 40 opens downward inside the cyclone case 14. Blow-by gas that has stopped gyrating is discharged toward an upper opening 46 from the lower opening 44 of the gas pipe 40.

A substantially circular plate-shaped partition member 42 juts out perpendicularly with respect to the gas pipe 40. The partition member 42 partitions a space in an upper portion inside of the cylindrical portion 16 of the cyclone case 14, in order to obstruct flow in which blow-by gas that has not yet been separated into gas and liquid is directly sucked into the gas pipe 40. The blow-by gas is able to sufficiently gyrate by the space being partitioned with the partition member 42.

Figure 3:
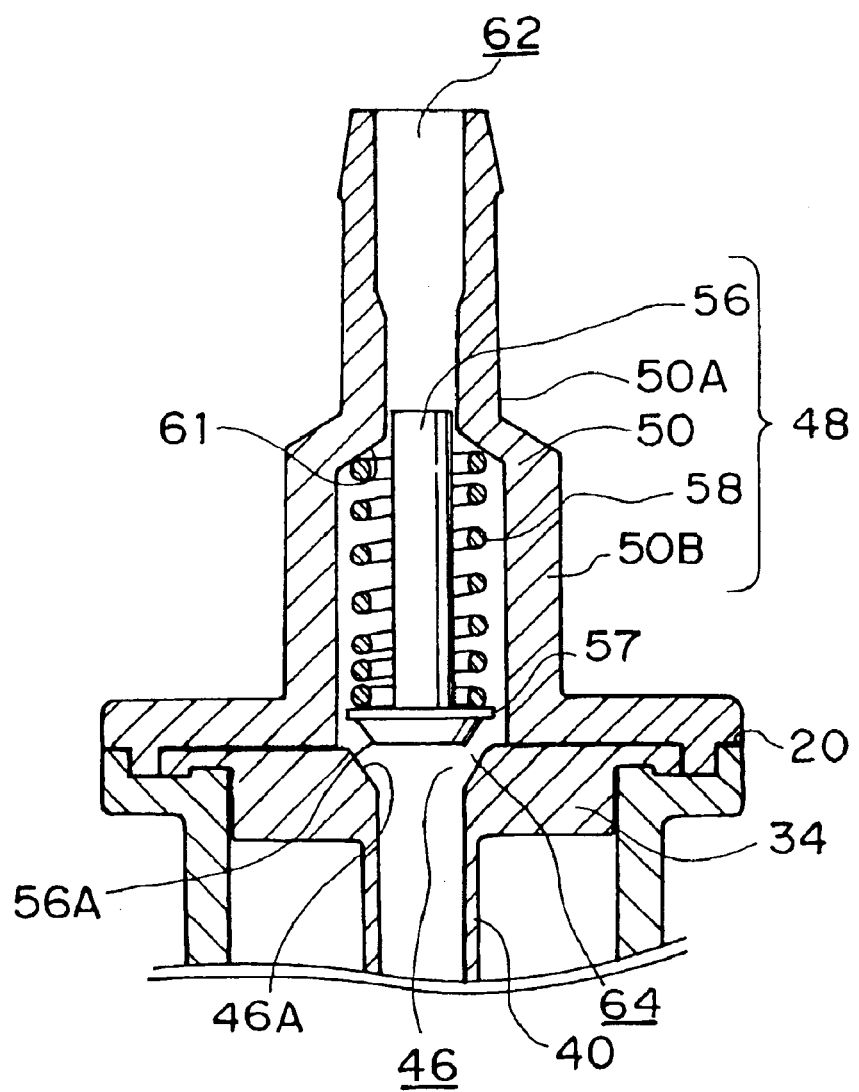
Figure 4:
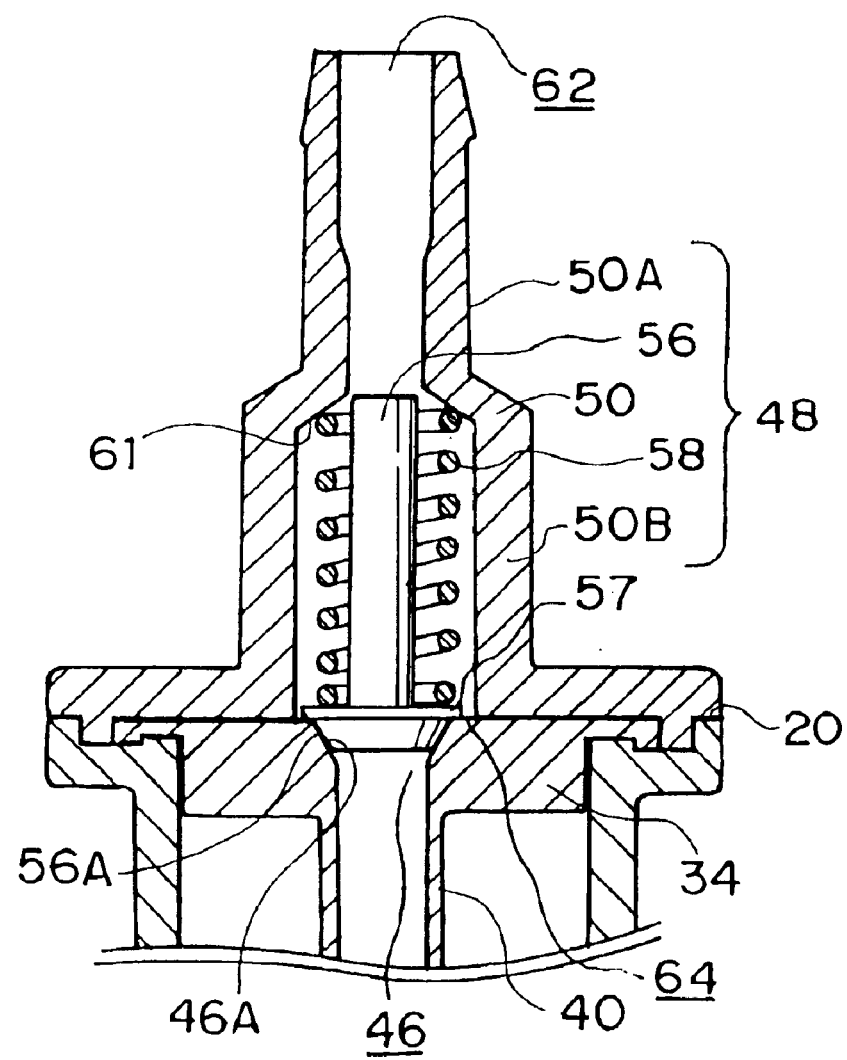
FIG. 4 is a cross-sectional view of the PCV valve in the gas/liquid separation system pertaining to the first embodiment of the invention, and illustrates a state in which a flow path of the blow-by gas is blocked off.

A PCV valve 48 is disposed above the gas outflow pipe 32. As shown in FIG. 3, the PCV valve 48 includes a housing 50 that comprises a small tube portion 50A and a large tube portion 50B. An upper opening 62 is formed at an upper end of the small tube portion 50A, and a lower opening 64 is formed at a lower end of the large tube portion 50B. A cylindrical valve element (valve) 56 is disposed inside the large tube 50B. A tapered surface 56A is formed at a lower end of the valve element (valve) 56 and abuts against an inclined surface 46A formed at the upper opening 46 of the gas pipe 40. A ring 57 is attached to the valve element (valve) 56. A spring 58 is accommodated between the ring 57 and an inclined step portion 61. The spring 58 urges the valve element (valve) 56 toward the upper opening 46 of the gas pipe 40. Thus, the upper opening 46 is closed off by the valve element (valve) 56 to block the flow path of the blow-by gas (see FIG. 4). When the valve element (valve) 56 is pushed by gas pressure and the spring 58 is compressed, a gap is formed between the valve element (valve) 56 and the inclined surface 46A, and gas flowing in from the gas pipe 40 is sucked upward. Thus, the flow volume of the gas is adjusted in accordance with gas pressure. That is, the valve element 56 is capable of moving toward the outer side of the cavity of the cyclone case 14 in accordance with gas pressure outside the cavity, and the valve adjusts the flow volume of the gas flowing from inside the cavity to outside the cavity in accordance with gas pressure outside the cavity. The valve element 56, preferably has a shaft portion having a shape which varies a cross sectional area of a gas flowing path, relative to a direction in which the gas flows.

Figure 5:
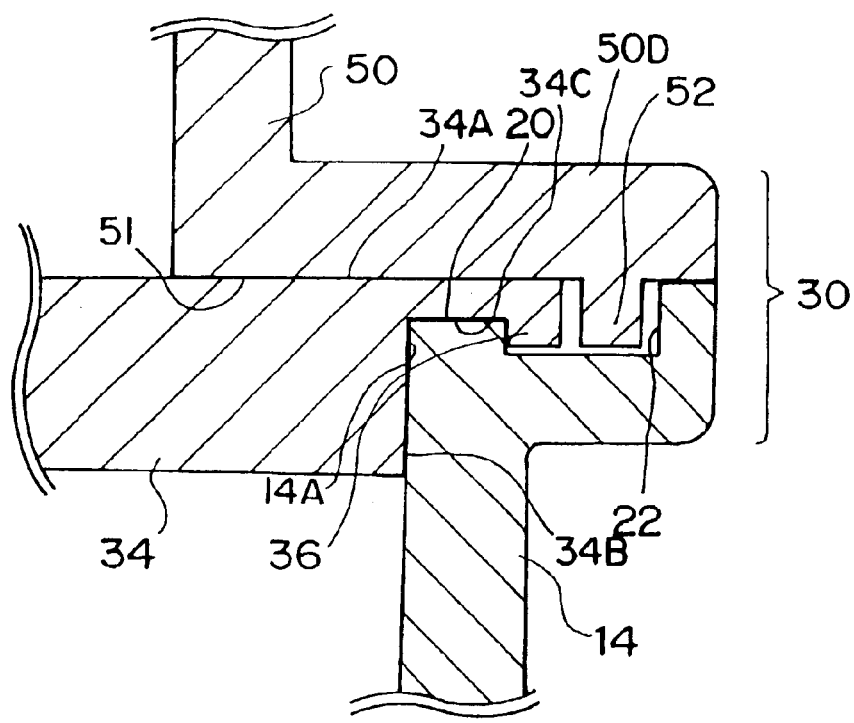
FIG. 5 is an expanded view of a welding portion of the gas/liquid separation system pertaining to the first embodiment of the invention.

As illustrated in FIG. 5, an annular recess 22 is formed in an upper opening edge portion 20 of the cyclone case 14.

Also, an annular recess 34C that engages with a peripheral wall of the annular recess 22 of the cyclone case 14 is formed at an outer peripheral portion of the flange portion 34. An annular projection 36 that engages with the annular recess 22 of the cyclone case 14 is formed at an outer side of the annular recess 34C. The annular projection 36 is disposed at a portion that protrudes outward from an upper edge portion of an outer peripheral surface 34B of the flange portion 34, protrudes vertically downward, and fits together with the annular recess 22 of the cyclone case 14. In this instance, a gap that becomes a welding portion is formed between the annular projection 36 of the flange portion 34 and the annular recess 22 of the cyclone case 14, and the outer peripheral surface 34B of the flange portion 34 and an inner peripheral surface 14A of the cyclone case 14 are tightly adhered.

An annular projection 52 is formed at a lower surface 51 of a flange 50D of the housing 50 in correspondence to the annular recess 22 of the cyclone case 14. The annular projection 52 of the housing 50 protrudes vertically downward and fits together with the annular recess 22 of the cyclone case 14. In this instance, a gap that becomes a welding portion is formed between the annular projection 52 of the housing 50 and the annular recess 22 of the cyclone case 14, and the lower surface 51 of the flange 50D of the housing 50 and the upper surface 34A of the flange portion 34 are tightly adhered.

In this structure, three parts—the housing 50, the cyclone case 14, and the gas outflow pipe 32 (see FIG. 1)—are simultaneously ultrasound welded at a fitting portion 30.

Thus, there is no need to respectively weld the three parts (i.e., the housing 50, the cyclone case 14, and the gas outflow pipe 32), the welding process is reduced because the welding is accomplished with one effort, the sealing property at the portion where the housing 50 communicates with the gas pipe 40 that returns the gas to the air intake system (see FIG. 1) can be secured, and the overall structure can be made compact.

Also, by assembling the housing 50 accommodating the valve element (valve) 56 (see FIG. 1) with the cyclone case 14 to make one part overall, the number of parts can be reduced when they are mounted in production.

Next, a second embodiment will be described.

Figure 6:
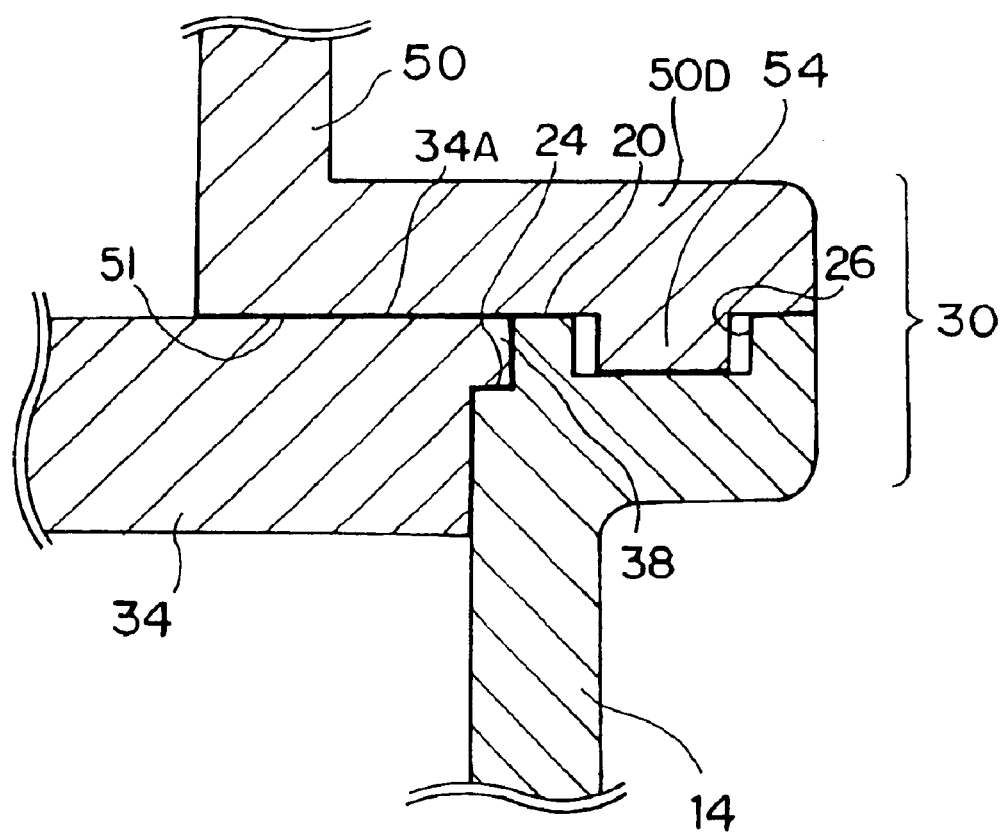
FIG. 6 is an expanded view of a welding portion of a gas/liquid separation system pertaining to a second embodiment of the invention.
Figure 7:
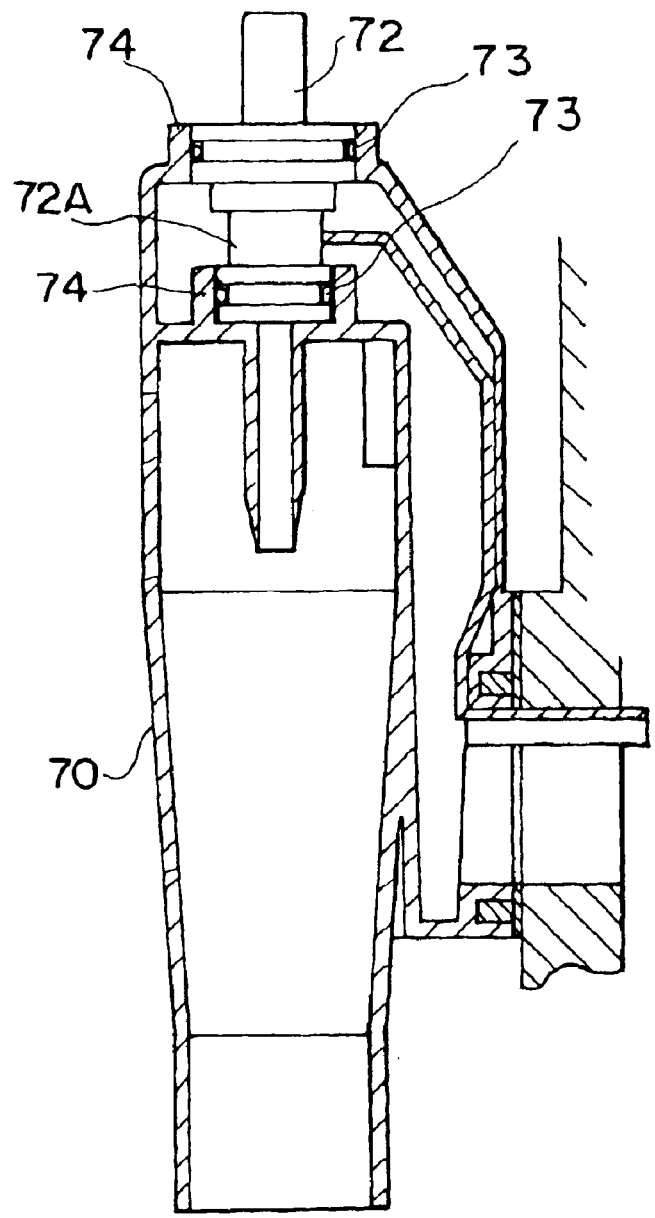
FIG. 7 is a longitudinal cross-sectional view of a gas/liquid separation system pertaining to conventional technology.

In the second embodiment, as illustrated in FIG. 6, an annular step portion 24 is formed at the inner wall of the cyclone case 14. An annular rib 38 is formed at an outer peripheral portion of the flange portion 34 (see FIG. 1) of the gas outflow pipe 32 in correspondence to the step portion 24. The annular rib 38 protrudes outward from the upper edge portion of the outer peripheral surface 34B of the flange portion 34, and a lower surface of the annular rib 38 is supported from below by the step portion 24 of the cyclone case 14. According to this structure, the flange portion 34 engages with the inner wall of the cyclone case 14 to close off the upper opening of the cyclone case 14.

An annular recess 26 is formed in the upper opening edge portion 20 of the cyclone case 14. The flange 50D juts out from the lower portion of the housing 50 in correspondence to the annular recess 26, and an annular projection 54 is formed at the flange 50D. The annular projection 54 protrudes vertically downward and fits together with the annular recess 26. In this instance, a gap that becomes a welding portion is formed between the annular projection 54 and the annular recess 26, and the lower surface 51 of the flange 50D of the housing 50 and the upper surface 34A of the flange portion 34 are tightly adhered.

Although the housing 50 and the cyclone case 14 are ultrasound welded at the fitting portion 30 in this structure, labor for welding the gas outflow pipe 32 can be omitted because the gas outflow pipe 32 is sandwiched between the cyclone case 14 and the housing 50.

Also, the process by which the housing 50 and the cyclone case 14 are welded can be reduced, the sealing property at the portion where the housing 50 communicates with the gas pipe 40 that returns the gas to the air intake system (see FIG. 1) can be secured, and the overall structure can be made compact.

Also, by assembling the housing 50 accommodating the valve element (valve) 56 (see FIG. 1) with the cyclone case 14 to make one part overall, the number of parts can be reduced when they are mounted in production.

Next, the action of the above-described embodiment will be described.

When blow-by gas including oil mist is introduced to the cylindrical portion 16 of the cyclone case 14 from the gas inflow pipe 12, the blow-by gas gyrates and descends along the inner wall surface of the cylindrical portion 16 inside the cyclone case 14. At this time, sufficient gyration of the blow-by gas including the oil mist is effected by the partition member 42, without the blow-by gas being directly sucked into the gas pipe 40. Thus, oil mist that is acted upon by centrifugal force strikes the inner wall surface of the cyclone case 14, and the blow-by gas is separated into gas and oil.

Oil that has been separated descends along the inner wall surface of the cyclone case 14 due to the force of gravity, is guided to the oil discharge pipe 28, and is discharged to the oil tank (not illustrated).

The blow-by gas is purified by the oil mist being removed therefrom by the gyration. The blow-by gas that has stopped gyrating flows out toward the gas pipe 40 of the gas outflow pipe 32 and proceeds to the inside the housing 50 from the gas pipe 40. Inside the housing 50, the spring 58 urges the valve element (valve) 56 toward the upper opening 46 of the gas pipe 40. When the valve element (valve) 56 is pushed by gas pressure of the blow-by gas proceeding to the inside of the housing 50, the spring 58 is compressed. As a result, a gap is formed between the valve element (valve) 56 and the inclined surface 46A, and the blow-by gas flowing out from the gas pipe 40 is sucked upward and returned to the air intake system. Thus, the flow of the gas is adjusted in accordance with gas pressure.

In the above-described embodiment, the invention was configured to have a structure in which one annular recess is disposed in the upper opening edge portion of the cyclone case, with the annular projection of the housing being fitted together with the annular recess. However, the present invention is not limited to the same. For instance, two annular recessions may also be disposed. The invention may also be configured to have a structure in which the annular projection is disposed at the upper opening edge portion of the cyclone case and the annular recess that fits together with the annular projection is disposed in the housing or in the gas outflow pipe.

Moreover, although embodiments of the invention have been described specifically using ultrasound welding as an example of a method of welding, the welding may also be accomplished with a laser, and the method of welding is not limited to the same.

As described above, according to the invention, there are excellent effects in that the process by which the cyclone case and the PCV valve are welded is reduced, the sealing property at the outflow portion that returns gas to the air intake system can be secured, and the overall structure becomes compact.

What is claimed is:

1. A gas/liquid separation system, comprising:
    a cyclone case including a cavity having an opening at an upper portion thereof, the cyclone case causing gas that is introduced to the cavity and includes oil mist to be circulated along a surface of the cavity and separating the gas into gas and oil;
    a gas outflow pipe including a flange that blocks the opening and a pipe that passes through the flange and allows the gas to circulate to the outside of the cavity; and
    a housing including a valve that adjusts a flow volume of the gas flowing out from the pipe, with the housing being welded to a peripheral edge portion of the upper opening of the cyclone case so as to accommodate the valve and cover the flange, and allowing the gas that has flowed out from the pipe to flow to the outside of the system.

2. The gas/liquid separation system of claim 1, wherein the gas introduced to the cavity is blow-by gas leaking from a combustion chamber in an automobile.

3. The gas/liquid separation system of claim 1, wherein the cavity has a substantially circular cross-section and the gas introduced to the cavity is introduced from a tangential direction of the circular cross-section.

4. The gas/liquid separation system of claim 1, wherein the valve adjusts the flow volume of the gas flowing from inside the cavity to outside the cavity in accordance with gas pressure outside the cavity.

5. The gas/liquid separation system of claim 1, wherein the valve includes, at an outer side of the cavity, a valve element that adjusts the flow volume of the gas and a spring that pushes the valve element toward the cavity.

6. The gas/liquid separation system of claim 1, wherein the pipe extends into the cavity from a substantial center of the flange and includes an end inside the cavity.

7. The gas/liquid separation system of claim 1, wherein the pipe includes a plate-shaped member that juts out inside the cavity in a direction that is perpendicular to an axis of the pipe.

8. The gas/liquid separation system of claim 1, wherein the cyclone case has, at the edge portion of the opening, an annular shape suited for fitting, and the housing has, at a position facing the annular shape, a shape that can be fitted together with the annular shape, and is fitted together with the cyclone case.

9. The gas/liquid separation system of claim 8, wherein the flange further has, at a position facing the annular shape of the cyclone case, a shape that can be fitted together with the annular shape, and the housing and the flange fit together with the cyclone case.

10. The gas/liquid separation system of claim 8, wherein the annular shape of the cyclone case is an annular recess.

11. The gas/liquid separation system of claim 8, wherein the annular shape of the cyclone case is an annular projection.

12. The gas/liquid separation system of claim 8, wherein the cyclone case has, at the edge portion of the opening, another annular shape that is suited for fitting.

13. The gas/liquid separation system of claim 1, wherein the cyclone case includes, at the edge portion of the opening, an annular shape suited for fitting, and the flange has, at a position facing the annular shape, a shape that can be fitted together with the annular shape, and is fitted together with the cyclone case.

14. The gas/liquid separation system of claim 8, wherein the cyclone case has an annular step portion formed at a cavity wall near the opening, and the flange includes an outer peripheral wall and an annular rib at an upper end of the outer peripheral wall, which engages with the annular step portion.

* * * * *